United States Patent [19]

Nosaka et al.

[11] Patent Number: 5,248,724
[45] Date of Patent: Sep. 28, 1993

[54] SIZING AGENT AND PAPER SIZED THEREWITH

[75] Inventors: Yoshihumi Nosaka; Osamu Ishiguro, both of Niigata, Japan

[73] Assignee: Denki Kagaku Kogyo Kabushiki Kaisha, Tokyo, Japan

[21] Appl. No.: 838,929

[22] Filed: Feb. 21, 1992

[30] Foreign Application Priority Data

Feb. 22, 1991 [JP] Japan .................. 3-048702

[51] Int. Cl.$^5$ ............................. C08G 63/48
[52] U.S. Cl. ..................... 525/58; 524/378; 524/503
[58] Field of Search .............. 524/503, 378; 525/58

[56] References Cited

U.S. PATENT DOCUMENTS

| | | | |
|---|---|---|---|
| 3,634,295 | 1/1972 | Dunlap et al. | 525/58 X |
| 3,666,400 | 5/1972 | Lofton et al. | 525/58 X |
| 3,817,898 | 6/1974 | Ward | 525/58 X |
| 4,206,101 | 6/1980 | Wysong | 525/58 X |
| 4,379,095 | 4/1983 | Oldack | 524/378 X |
| 4,388,442 | 6/1983 | Taniguchi et al. | 525/58 X |
| 4,389,506 | 6/1983 | Hassall, Jr. | 525/58 X |
| 4,640,946 | 2/1987 | Vassallo et al. | 524/378 X |
| 4,735,986 | 4/1988 | Iacoriello | 524/503 X |
| 4,824,904 | 4/1989 | Aoyama et al. | 525/58 X |
| 5,110,859 | 5/1992 | Flesher et al. | 524/503 |

FOREIGN PATENT DOCUMENTS 49-41611  4/1974  Japan .

*Primary Examiner*—Joseph L. Schofer
*Assistant Examiner*—J. M. Reddick
*Attorney, Agent, or Firm*—Oblon, Spivak, McClelland, Maier & Neustadt

[57] ABSTRACT

A sizing agent for paper, which comprises 100 parts by weight of a polyvinyl alcohol (component A) and from 1 to 20 parts by weight of a compound (component B) provided with the following requisites (1) to (4): (1) the backbone chain is a block copolymer of ethylene oxide and propylene oxide, (2) in the backbone chain, the proportion of oxyethylene units is from 20 to 40% by weight, and the proportion of oxypropylene units is from 60 to 80% by weight, (3) of the two terminals, one terminal is a hydrogen atom bonded to an oxygen atom of an oxyethylene unit or an oxypropylene unit, and the other terminal is a $C_{1-10}$ alkoxyl group or a hydrogen atom bonded to an oxygen atom of an oxyethylene unit or an oxypropylene unit, and (4) the weight average molecular weight is from 600 to 1,200.

10 Claims, No Drawings

SIZING AGENT AND PAPER SIZED THEREWITH

BACKGROUND OF THE INVENTION

1. Field of the Invention

The present invention relates to a sizing agent for paper, which is useful for sizing paper or paper board (hereinafter paper and paper board will be generally referred to simply as "paper") and paper sized with such a sizing agent.

2. Discussion of Background

Heretofore, various sizing agents have been used to improve various strength and printability of paper or the appearance of printed matters. Among such sizing agents, those using a polyvinyl alcohol, a starch or both of them, are typical.

However, paper sized with a starch has a drawback such that when it is subjected to printing, paper powder is likely to form, and such paper powder tends to deteriorate the appearance of the printed matter, or such paper powder is likely to accumulate between printing rollers, thus leading to a trouble of e.g. rupture of the paper. Further, paper sized with a starch tends to have inadequate strength, whereby defects such as picking and blistering are likely to occur at the printed surface, and such tendency is particularly remarkable when the printing speed is high.

On the other hand, paper sized with a polyvinyl alcohol has a drawback such that it shows tackiness in a state wet with water, although it exhibits excellent properties with no substantial formation of paper powder or with no substantial deterioration of the appearance due to damage of the printed surface given by high speed printing. This drawback causes, for example, a printing trouble such that when the paper sized with a polyvinyl alcohol is subjected to offset printing, if the paper is wetted upon contact with damping water, tackiness will be created, whereby a trouble such as adhesion of the paper to itself or adhesion of the paper to the printing rollers, is likely to result. If such a trouble occurs during printing, the printing operation will have to be stopped, thus leading to a substantial loss in the productivity and a loss of materials, and further the machine is likely to be damaged.

Japanese Unexamined Patent Publication No. 41611/1974 discloses a sizing agent having a non-ionic surfactant incorporated to a polyvinyl alcohol and having a third component such as urea, a urea derivative, thiourea, a thiourea derivative or a guanidine derivative incorporated. However, this sizing agent requires a third component such as urea, as an essential component. Besides, the effect for reducing the tackiness of the sized paper in a wet state, is still inadequate.

Reflecting a trend in recent years for multi-color printing or weight reduction of medium or low quality paper such as paper for newspapers, which is subjected to high speed printing in a large quantity, it has become common to size such medium or low quality paper, and it has become common to employ an offset printing system as a printing system for such sized paper. Therefore, it has been desired to develop a sizing agent for paper which presents low tackiness even when the sized paper is in a wet state and which is excellent in sizing effects.

SUMMARY OF THE INVENTION

It is an object of the present invention to solve the above problems.

The present invention provides a sizing agent for paper, which comprises 100 parts by weight of a polyvinyl alcohol (component A) and from 1 to 20 parts by weight of a compound (component B) provided with the following requisites (1) to (4):

(1) the backbone chain is a block copolymer of ethylene oxide and propylene oxide, (2) in the backbone chain, the proportion of oxyethylene units is from 20 to 40% by weight, and the proportion of oxypropylene units is from 60 to 80% by weight, (3) of the two terminals, one terminal is a hydrogen atom bonded to an oxygen atom of an oxyethylene unit or an oxypropylene unit, and the other terminal is a $C_{1-10}$ alkoxyl group or a hydrogen atom bonded to an oxygen atom of an oxyethylene unit or an oxypropylene unit, and (4) the weight average molecular weight is from 600 to 1,200.

The present invention also provides paper sized with such a sizing agent.

DETAILED DESCRIPTION OF THE PREFERRED EMBODIMENTS

There is no particular restriction as to component A i.e. the polyvinyl alcohol (hereinafter referred to simply as PVA) to be used for the sizing agent of the present invention. PVA obtained by hydrolyzing a homopolymer or copolymer of a fatty acid vinyl ester, is commonly employed. It is particularly preferred to employ PVA obtained by completely or partially hydrolyzing a polymer of vinyl acetate. The fatty acid vinyl ester includes, for example, vinyl propionate and vinyl formate in addition to vinyl acetate.

PVA may be a PVA obtained by completely or partially hydrolyzing a homopolymer or copolymer obtained by polymerizing one or more such fatty acid vinyl esters, or a copolymer of one or more such fatty acid vinyl esters with one or more other monomers copolymerizable therewith, or a PVA obtained by post-modifying such a PVA.

Said other monomers copolymerizable with fatty acid vinyl esters, include, for example, olefins such as ethylene and propylene; polymerizable monocarboxylic acids such as acrylic acid, methacrylic acid, crotonic acid and isocrotonic acid; polymerizable dicarboxylic acids such as maleic acid, fumaric acid and itaconic acid; polymerizable dicarboxylic anhydrides such as maleic anhydride; esters and salts of polymerizable monocarboxylic acids and polymerizable dicarboxylic acids; polymerizable acid amides such as acrylamide and methacrylamide; acrylates such as methyl acrylate, ethyl acrylate and butyl acrylate; methacrylates such as methyl methacrylate, ethyl methacrylate and butyl methacrylate; vinyl halides such as vinyl chloride and vinyl fluoride; vinylidene halides such as vinylidene chloride and vinylidene fluoride; monomers having glycidyl groups, such as allylglycidyl ether and glycidyl methacrylate; and alkylvinyl ethers.

The average degree of polymerization of PVA is preferably from 500 to 4,000, more preferably from 1,000 to 3,000, with a view to increasing the strength of paper. Further, PVA is preferably water-soluble, and its degree of hydrolysis is usually at least 90 mol %, preferably at least 95 mol %, more preferably at least 97.5 mol % with a view to low moisture sensitivity and high strength of paper. In the present invention, a plurality of PVA differing in the degree of polymerization, the degree of hydrolysis or the units constituting PVA, may be used in combination.

Component B to be used in the present invention is a compound wherein the backbone chain is a block copolymer of ethylene oxide and propylene oxide, which comprises from 20 to 40% by weight of oxyethylene units and from 60 to 80% by weight of oxypropylene units, and one of the two terminals is a hydrogen atom and the other is a $C_{1-10}$ alkoxyl group or a hydrogen atom, and which has a weight average molecular weight of from 600 to 1,200.

In the compound of component B, the weight average molecular weight of the block portion composed of oxyethylene units in the backbone chain is preferably within a range of from 80 to 500, and the weight average molecular weight of the block portion composed of oxypropylene units is preferably within a range of from 300 to 600.

If the proportions of the oxyethylene units and the oxypropylene units in the backbone chain are outside the above ranges, if the carbon number of the alkoxyl group is 11 or more, or if the weight average molecular weight is outside the range of from 600 to 1,200, the effect for reducing the tackiness of the sized paper in a wet state, tends to be inadequate.

Component B includes, for example, compounds satisfying the above requirements (1) to (4), as identified in the following items (i) to (iv). Among then, a compound of type (a) as identified in the following item (i) and a compound of type (b) as identified in the following item (ii) are preferred.

(i) A compound wherein the backbone chain is a block copolymer obtained by addition-polymerizing propylene oxide to a $C_{1-10}$ alcohol to form a block of oxypropylene units and then addition-polymerizing ethylene oxide to the terminal of the obtained block to which no alkoxyl group is bonded, to form a block of oxyethylene units, and one of the two terminals is an alkoxyl group and the other is a hydrogen atom bonded to an oxygen atom of an oxyethylene unit (hereinafter referred to as a compound of type (a)).

(ii) A compound wherein the backbone chain is a block copolymer obtained by addition-polymerizing ethylene oxide to a $C_{1-10}$ alcohol to form a block of oxyethylene units and then addition-polymerizing propylene oxide to the terminal of the obtained block to which no alkoxyl group is bonded, to form a block of oxypropylene units, and one of the two terminals is an alkoxyl group and the other is a hydrogen atom bonded to an oxygen atom of an oxypropylene unit (hereinafter referred to as a compound of type (b)).

(iii) A compound wherein the backbone chain is a block copolymer obtained by addition-polymerizing propylene oxide to both terminals of dipropylene glycol to form blocks of oxypropylene units and then addition-polymerizing ethylene oxide to both terminals of the obtained blocks, to form blocks of oxyethylene units at the respective terminals, and both terminals are hydrogen atoms bonded to oxygen atoms of oxyethylene units (hereinafter referred to as a compound of type (c)).

(iv) A compound wherein the backbone chain is a block copolymer obtained by addition-polymerizing ethylene oxide to both terminals of diethylene glycol to form blocks of oxyethylene units and then addition-polymerizing propylene oxide to the both terminals of the obtained blocks, to form blocks of oxypropylene units at the respective terminals, and both terminals are hydrogen atoms bonded to oxygen atoms of oxypropylene units (hereinafter referred to as a compound of type (d)).

In the present invention, such compounds may be used alone or in combination as a mixture of two or more of them, as component B. The amount of component B to be used is from 1 to 20 parts by weight, preferably from 2 to 10 parts by weight, per 100 parts by weight of PVA. If the amount of component B is less than 1 part by weight, the effect for reducing tackiness of the sized paper in a wet state to itself or to printing rollers, tends to be low. On the other hand, if it exceeds 20 parts by weight, it impairs the effect of PVA as a sizing agent.

There is no particular restriction as to the form of the sizing agent of the present invention. For example, it may be a mixture of powdery PVA and component B or a mixture of a solution of PVA and component B.

The sizing agent of the present invention may contain or may be used in combination with other components, as the case requires, to such an extent not to impair the effects of the present invention. As such other components, starches such as corn starch and oxidized starch, cellulose compounds such as carboxymethyl cellulose, methyl cellulose and hydroxyalkyl cellulose, synthetic rubber latexes such as a styrene-butadiene copolymer latex and a styrene-butadiene-methacrylate copolymer latex, a water-resisting agent for PVA, inorganic pigments such as titanium oxide, clay and calcium carbonate, synthetic resin pigments such as fine powdery thermosetting resins (such as a urea resin or a melamine resin) and fine powdery thermoplastic resins (such as a vinylidene chloride resin, a vinyl chloride resin or a styrene-butadiene copolymer resin) and a defoaming agent, may, for example, be mentioned.

In a case where the sizing agent of the present invention is used in combination with a pigment, the concentration of a non-volatile content in the sizing solution is usually limited to a level of from 1 to 20% by weight, and in the non-volatile content, the amount of pigment is usually less than 400 parts by weight per 100 parts by weight of the sizing agent in order to avoid a substantial increase in the weight of paper by sizing.

Further, the sizing agent of the present invention may be used in combination with a material other than those mentioned above or with a sizing agent other than PVA.

The sizing agent of the present invention may be coated on paper or impregnated in paper in the form of an aqueous solution or an aqueous dispersion. To obtain an aqueous solution or aqueous dispersion of the sizing agent, a mixture of PVA (component A) and component B, may, for example, be dissolved or dispersed in water, or an aqueous solution or dispersion of PVA and an aqueous solution or dispersion of component B may be mixed. Otherwise, one of PVA and component B is dissolved or dispersed in water, and the other component is then mixed thereto. To incorporate other components or a sizing agent other than PVA, such material may be mixed to the sizing agent of the present invention in a liquid or solid form by a method suitable for such material.

The sized paper of the present invention can be obtained by using, as a sizing solution, an aqueous solution or aqueous dispersion containing the sizing agent of the present invention and by coating or impregnating this solution on one side or both sides of paper by means of a conventional apparatus such as a gate roll coater, a size press or a bar coater, followed by drying the paper.

The amount of the sizing agent of the present invention contained in the above sizing solution, is optionally selected depending upon the desired coated amount (an increase in the dry weight of paper caused by coating), the apparatus to be used for coating or the conditions for the coating operation. It is usually at a level of from 0.5 to 8 parts by weight per 100 parts by weight of the total amount of the sizing agent and water in the sizing solution.

The coated amount of the sizing agent of the present invention on the paper to be sized, may optionally be selected depending upon e.g. the desired properties of sized paper. It is usually at a level of from 0.05 to 0.5 $g/m^2$ per one side of paper.

The paper sized with the sizing agent of the present invention has excellent properties such that the tackiness in a wet state is low, smooth printing can be conducted even by high speed offset printing, and printed matters with excellent finish can be obtained.

Now, the present invention will be described in further detail with reference to Examples and Comparative Examples. However, it should be understood that the present invention is by no means restricted to such specific Examples.

In the following Examples and Comparative Examples, the structure, composition, etc. of a compound wherein the backbone chain is a block copolymer of ethylene oxide and propylene oxide, were analyzed by NMR, etc. Further, the weight average molecular weight was calculated from a hydroxyl value which was obtained by esterifying hydroxyl groups of the compound (OH composed of oxygen atoms of oxyethylene, or oxypropylene units and hydrogen atoms bonded thereto) with phthalic anhydride in pyridine, followed by titration with potassium hydroxide.

EXAMPLE 1

To a 1.4 wt % aqueous solution of PVA K-17 (manufactured by Denki Kagaku Kogyo K.K., average degree of polymerization: 1,700, degree of hydrolysis: 99.0 mol %), a compound of type (a) wherein the backbone chain is a block copolymer of ethylene oxide and propylene oxide, one of the terminals is a $C_8$ alkoxyl group and the other terminal is a hydrogen atom bonded to an oxygen atom of an oxyethylene unit, and in the backbone chain, the proportion of oxyethylene units is 30% by weight and the proportion of oxypropylene units is 70% by weight, and which has a weight average molecular weight of 840 (A-0638, manufactured by Toho Chemical Co., Ltd.), was added and mixed as component B in an amount of 5 parts by weight per 100 parts by weight of PVA, to obtain a sizing solution.

Using this sizing solution, coated paper was prepared in accordance with the method as described in the following item (1), and tests for evaluating this coated paper were conducted in accordance with the methods as described in the following item (2). The properties and the amounts of blend materials are shown in Table 1, and the test results are shown in Table 3.

(1) Preparation of Coated Paper

The sizing solution was coated on one side of raw paper (basis weight: 46 $g/m^2$) for newspapers by a coating rod so that the coated amount of the sizing agent would be 0.4 $g/m^2$. The coated paper was dried in air, followed by one pass treatment by an iron press (70° C.). Then, it was adjusted at 20° C. for 24 hours under a relative humidity of 65% to obtain coated paper for evaluation tests.

(2) Tests for Evaluating Physical Properties of the Coated Paper

Sticking Strength of Coated Paper/Coated Paper

A sheet of the coated paper having a width of 30 mm and a length of 100 mm was dipped in water at a temperature of 20° C. for 5 seconds. Then, it was folded to a length of 50 mm so that the coated surface was in contact, and non-coated paper was placed on each exterior side, followed by pressing under a pressure of 50 $kg/cm^2$ for 5 seconds to obtain a test specimen. Immediately after the pressing, this test specimen was subjected to T type peeling by pulling at a speed of 30 mm/min by means of a tensile tester (UTM-4-100), whereby the load required for peeling the sticked coated surface, was measured. This load value was taken as the sticking strength (g/30 mm) of coated paper/coated paper.

Sticking Strength of Rubber Sheet/Coated Paper

The coated paper having a width of 100 mm was dipped in water at 20° C. for 5 seconds. Then, this paper was placed on a rubber sheet (150×150 mm, manufactured by NBR) so that the coated surface contacted the rubber sheet, and on the non-coated side of the coated sheet, two sheets of non-coated paper were placed, followed by pressing under a pressure of 10 $kg/cm^2$ for 5 seconds to obtain a test specimen. Immediately after the pressing, this test specimen was subjected to T type peeling by pulling at a speed of 1,000 mm/min by a tensile tester, whereby the load required for peeling the coated surface from the rubber sheet, was measured. This load value was taken as the sticking strength (g/100 mm) of rubber sheet/coated paper.

RI Printability

Using a RI tester, printing was conducted in a wet state under a printing pressure of 8 mm using ink IPI#6, and the printed surface was visually evaluated in accordance with the following evaluation standards of four grades.

Evaluation Standard

0: No change
1: Slight blistering observed
2: Slight picking observed, and blistering observed
3: Rupture of paper observed

EXAMPLES 2 TO 4

A sizing solution was prepared in the same manner as in Example 1 except that the amount of component B used in Example 1 was changed as identified in Table 1. Using this sizing solution, the tests were conducted in the same manner as in Example 1, and the results are shown in Table 3.

EXAMPLE 5

A sizing solution was prepared in the same manner as in Example 1 except that a compound of type (c) wherein the backbone chain is a block copolymer of ethylene oxide and propylene oxide, each terminal is a hydrogen atom bonded to an oxygen atom of an oxyethylene unit, and in the backbone chain, the proportion of oxyethylene units is 24% by weight and the proportion of oxypropylene units is 76% by weight and which has a weight average molecular weight of 690 (B-053, manufactured by Toho Chemical Co., Ltd.), was used as component B. Using this sizing solution, the tests were conducted in the same manner as in Example 1. The properties of the blend materials are shown in Table 1, and the test results are shown in Table 3.

EXAMPLE 6

A sizing solution was prepared in the same manner as in Example 1 except that a compound of type (b) wherein the backbone chain is a block copolymer of ethylene oxide and propylene oxide, one terminal is a $C_{10}$ alkoxyl group and the other terminal is a hydrogen atom bonded to an oxygen atom of an oxypropylene unit, and in the backbone chain, the proportion of oxyethylene units is 39% by weight and the proportion of oxypropylene units is 61% by weight and which has a weight average molecular weight of 730 (AS-053X, manufactured by Toho Chemical Co., Ltd.), was used as component B. Using this sizing solution, the tests were conducted in the same manner as in Example 1. The properties of the blend materials are shown in Table 1, and the test results are shown in Table 3.

EXAMPLES 7 TO 8

A sizing solution was prepared in the same manner as in Example 1 except that instead of PVA used in Example 1, a PVA having an average degree of polymerization of 1,700 and a degree of hydrolysis as identified in Table 1, was used. Using this sizing solution, the tests were conducted in the same manner as in Example 1. The properties of the blend materials are shown in Table 1, and the tests results are shown in Table 3.

EXAMPLE 9

A sizing solution was prepared in the same manner as in Example 1 except that instead of PVA used in Example 1, PVA K-24E (manufactured by Denki Kagaku Kogyo K.K., average degree of polymerization: 2,400, degree of hydrolysis: 98.5 mol %) was used. Using this sizing solution, the tests were conducted in the same manner in Example 1. The properties of the blend materials are shown in Table 1, and the test results are shown in Table 3.

EXAMPLE 10

A sizing solution was prepared in the same manner as in Example 1 except that a compound of type (a) wherein the backbone chain is a block copolymer of ethylene oxide and propylene oxide, one terminal is a $C_1$ alkoxyl group and the other terminal is a hydrogen atom bonded to an oxygen atom of an oxyethylene unit, and in the backbone chain, the proportion of oxyethylene units is 30% by weight and the proportion of oxypropylene units is 70% by weight and which has a weight average molecular weight of 740, was used as component B. Using this sizing solution, the tests were conducted in the same manner as in Example 1. The properties of the blend materials are shown in Table 1, and the test results are shown in Table 3.

EXAMPLE 11

A sizing solution was prepared in the same manner as in Example 1 except that a compound of type (d) wherein the backbone chain is a block copolymer of ethylene oxide and propylene oxide, each terminal is a hydrogen atom bonded to an oxygen atom of an oxypropylene unit, and in the backbone chain, the proportion of oxyethylene units is 30% by weight and the proportion of oxypropylene units is 70% by weight and which have a weight average molecular weight of 690, was used as component B. Using this sizing solution, the tests were conducted in the same manner as in Example 1. The properties of the blend materials are shown in Table 1, and the test results are shown in Table 3.

COMPARATIVE EXAMPLE 1

A 1.4 wt % aqueous solution of PVA K-17 was used as a sizing solution. Using this sizing solution, the tests were conducted in the same manner as in Example 1, and the results are shown in Table 3.

COMPARATIVE EXAMPLES 2 AND 3

A sizing solution was prepared in the same manner as in Example 1 except that the amount of component B used in Example 1 was changed as identified in Table 2. Using this sizing solution, the tests were conducted in the same manner as in Example 1, and the results are shown in Table 3.

COMPARATIVE EXAMPLE 4

A sizing solution was prepared in the same manner as in Example 1 except that a compound of type (a) wherein the backbone chain is a block copolymer of ethylene oxide and propylene oxide, one terminal is a $C_8$ alkoxyl group and the other terminal is a hydrogen atom bonded to an oxygen atom of an oxyethylene unit, and in the backbone chain, the proportion of oxyethylene units is 30% by weight and the proportion of oxypropylene units is 70% by weight and which has a weight average molecular weight of 570 (A-0438, manufactured by Toho Chemical Co., Ltd.), was used. Using this sizing solution, the tests were conducted in the same manner as in Example 1. The properties of the blend materials are shown in Table 2, and the test results are shown in Table 3.

COMPARATIVE EXAMPLE 5

A sizing solution was prepared in the same manner as in Example 1 except that a compound of type (a) wherein the backbone chain is a block copolymer of ethylene oxide and propylene oxide, and one terminal is a $C_8$ alkoxyl group and the other terminal is a hydrogen atom bonded to an oxygen atom of an oxyethylene unit, and in the backbone chain, the proportion of oxyethylene units is 54% by weight and the proportion of oxypropylene units is 46% by weight and which has a weight average molecular weight of 1,700 (A-0858, manufactured Toho Chemical Co., Ltd.), was used. Using this sizing solution, the tests were conducted in the same manner in Example 1. The properties of the blend materials are shown in Table 2 and test results are shown in Table 3.

COMPARATIVE EXAMPLE 6

A sizing solution was prepared in the same manner as in Example 1 except that a compound of type (c) wherein the backbone chain is a block copolymer ethylene oxide and propylene oxide, each terminal is a hydrogen atom bonded to an oxygen atom of an oxyethylene unit, and in the backbone chain, the proportion of oxyethylene units is 18% by weight and the proportion of oxypropylene units is 82% by weight and which has a weight average molecular weight of 2,150 (B-181, manufactured by Toho Chemical Co., Ltd.), was used. Using this sizing solution, the tests were conducted in the same manner as in Example 1. The properties of the blend materials are shown in Table 2 and the test results are shown in Table 3.

COMPARATIVE EXAMPLE 7

A 1.4 wt % aqueous solution of starch (MS-3800, manufactured by Nippon Shokuhin Kako K.K.) was used as a sizing solution. Using this sizing solution, the tests were conducted in the same manner as in Example 1, and the results are shown in Table 3.

COMPARATIVE EXAMPLE 8

To a 1.4 wt % aqueous solution of PVA K-17, a commercially available paraffin emulsion was incorporated in a weight ratio of PVA/paraffin emulsion (non-volatile content)=3/1, to obtain a sizing solution. Using this sizing solution, the tests were conducted in the same manner as in Example 1, and the results are shown in Table 3.

COMPARATIVE EXAMPLE 9

To a 1.4 wt % aqueous solution of PVA K-17, polyoxyethylene nonylphenyl ether as a non-ionic surfactant and urea were incorporated in a weight ratio of PVA/polyoxyethylene nonylphenylether/urea=100/5/10, to obtain a sizing solution. Using this sizing solution, the tests were conducted in the same manner as in Example 1, and the results are shown in Table 3.

COMPARATIVE EXAMPLE 10

With respect to the non-coated paper (raw paper for newspapers, basis weight: 46 g/m$^2$), the tests for evaluating the physical properties were conducted in the same manner as in Example 1, and the results are shown in Table 3.

COMPARATIVE EXAMPLE 11

A sizing solution was prepared in the same manner as in Example 1 except that a compound of type (b) wherein the backbone chain is a block copolymer of ethylene oxide and propylene oxide, one terminal is a $C_{13}$ alkoxyl group and the other terminal is a hydrogen atom bonded to an oxygen atom of an oxypropylene unit, and in the backbone chain, the proportion of oxyethylene units is 50% by weight and the proportion of oxypropylene units is 50% by weight and which has a weight average molecular weight of 880 (AS-054C, manufactured by Toho Chemical Co., Ltd.) was used. Using this sizing solution, the tests were conducted in the same manner as in Example 1. The properties of the blend materials are shown in Table 2, and the tests results are shown in Table 3.

TABLE 1

| Example No. | Component A (PVA) | | Component B | | | | | |
|---|---|---|---|---|---|---|---|---|
| | Average degree of polymerization | Degree of hydrolysis (mol %) | Amount | Type of compound | Number of carbon atoms in the terminal alkoxyl group | Weight average molecular weight | Backbone chain (wt %) | |
| | | | | | | | Oxyethylene units | Oxypropylene units |
| 1 | 1,700 | 99.0 | 5 | (a) | 8 | 840 | 30 | 70 |
| 2 | 1,700 | 99.0 | 2 | (a) | 8 | 840 | 30 | 70 |
| 3 | 1,700 | 99.0 | 10 | (a) | 8 | 840 | 30 | 70 |
| 4 | 1,700 | 99.0 | 1 | (a) | 8 | 840 | 30 | 70 |
| 5 | 1,700 | 99.0 | 5 | (c) | H | 690 | 24 | 76 |
| 6 | 1,700 | 99.0 | 5 | (b) | 10 | 730 | 39 | 61 |
| 7 | 1,700 | 97.5 | 5 | (a) | 8 | 840 | 30 | 70 |
| 8 | 1,700 | 96.5 | 5 | (a) | 8 | 840 | 30 | 70 |
| 9 | 2,400 | 98.5 | 5 | (a) | 8 | 840 | 30 | 70 |
| 10 | 1,700 | 99.0 | 5 | (a) | 1 | 740 | 30 | 70 |
| 11 | 1,700 | 99.0 | 5 | (d) | H | 690 | 30 | 70 |

Note 1) "H" in the column for "number of carbon atoms in the terminal alkoxyl group" indicates a case where each terminal of component B is a hydrogen atom bonded to an oxygen atom of an oxyethylene unit or an oxypropylene unit.
Note 2) The amount of component B is represented by parts by weight of component B per 100 parts by weight of component A (PVA).

TABLE 2

| Comparative Example No. | Component A (PVA) | | Component B | | | | | |
|---|---|---|---|---|---|---|---|---|
| | Average degree of polymerization | Degree of hydrolysis (mol %) | Amount | Type of compound | Number of carbon atoms in the terminal alkoxyl group | Weight average molecular weight | Backbone chain (wt %) | |
| | | | | | | | Oxyethylene units | Oxypropylene units |
| 1 | 1,700 | 99.0 | — | — | — | — | — | — |
| 2 | 1,700 | 99.0 | 0.5 | (a) | 8 | 840 | 30 | 70 |
| 3 | 1,700 | 99.0 | 30 | (a) | 8 | 840 | 30 | 70 |
| 4 | 1,700 | 99.0 | 5 | (a) | 8 | 570 | 30 | 70 |
| 5 | 1,700 | 99.0 | 5 | (a) | 8 | 1,700 | 54 | 46 |
| 6 | 1,700 | 99.0 | 5 | (c) | H | 2,150 | 18 | 82 |
| 7 | — | — | — | — | — | — | — | — |
| 8 | 1,700 | 99.0 | — | — | — | — | — | — |
| 9 | 1,700 | 99.0 | — | — | — | — | — | — |
| 10 | — | — | — | — | — | — | — | — |

TABLE 2-continued

| Comparative Example No. | Component A (PVA) | | Component B | | | | | |
|---|---|---|---|---|---|---|---|---|
| | Average degree of polymerization | Degree of hydrolysis (mol %) | Amount | Type of compound | Number of carbon atoms in the terminal alkoxyl group | Weight average molecular weight | Backbone chain (wt %) | |
| | | | | | | | Oxyethylene units | Oxypropylene units |
| 11 | 1,700 | 99.0 | 5 | (b) | 13 | 880 | 50 | 50 |

Note 1) "H" in the column for "number of carbon atoms in the terminal alkoxyl group" indicates a case where each terminal of component B is a hydrogen atom bonded to an oxygen atom of an oxyethylene unit or an oxypropylene unit.
Note 2) The amount of component B is represented by parts by weight of component B per 100 parts by weight of component A (PVA).

TABLE 3

Physical properties of coated paper

| | Sticking strength of coated paper/coated paper (g/30 mm) | Sticking strength of rubber sheet/coated paper (g/100 mm) | RI picking |
|---|---|---|---|
| Example 1 | 3.3 | 1.1 | 0 |
| Example 2 | 3.8 | 1.3 | 0 |
| Example 3 | 3.7 | 1.2 | 1 |
| Example 4 | 6.9 | 2.1 | 0 |
| Example 5 | 5.2 | 1.9 | 1 |
| Example 6 | 5.8 | 2.0 | 1 |
| Example 7 | 4.8 | 1.5 | 1 |
| Example 8 | 5.9 | 2.0 | 1 |
| Example 9 | 4.2 | 1.4 | 0 |
| Example 10 | 4.2 | 1.4 | 1 |
| Example 11 | 5.8 | 2.0 | 1 |
| Comparative Example 1 | 43.9 | 3.1 | 0 |
| Comparative Example 2 | 24.3 | 2.5 | 0 |
| Comparative Example 3 | 3.8 | 1.3 | 2 |
| Comparative Example 4 | 8.3 | 2.2 | 0 |
| Comparative Example 5 | 8.7 | 2.3 | 1 |
| Comparative Example 6 | 9.7 | 2.7 | 1 |
| Comparative Example 7 | 8.4 | 2.3 | 2 |
| Comparative Example 8 | 12.8 | 2.8 | 1 |
| Comparative Example 9 | 13.3 | 2.8 | 2 |
| Comparative Example 10 | 1.3 | 0.1 | 3 |
| Comparative Example 11 | 8.1 | 2.4 | 1 | used. The IGT printability was measured in accordance with the following item (3).

(1) Sizing solution used

Example 12: same as in Example 1
Example 13: same as in Example 6
Example 14: same as in Example 5
Example 15: same as in Example 11
Comparative Example 12: same as Comparative Example 1
Comparative Example 13: same as Comparative Example 7

(2) Preparation of coated paper

A sizing solution was coated on one side of raw paper for newspapers having a width of 450 mm (basis weight: 48 g/m$^2$) by a gate roll coater for test at a coating speed of 100 m/min so that a dried coated amount would be 0.2 g/m$^2$, to obtain coated paper. This coated paper was adjusted at 20° C. for 24 hours under a relative humidity of 65% and used as a test specimen for evaluation.

(3) Test for evaluating IGT printability

Using a IGT printability tester, the IGT strength (cm/sec) was measured in accordance with TAPPI T-499 using ink IPI#8.

TABLE 4

| | Component A (PVA) | | Type of compound as component B | Physical properties of coated paper | | |
|---|---|---|---|---|---|---|
| | Average degree of polymerization | Degree of hydrolysis (mol %) | | Sticking strength of coated paper/coated paper (g/30 mm) | RI picking | IGT strength (cm/sec) |
| Example 12 | 1,700 | 99.0 | (a) | 4.5 | 0 | 55 |
| Example 13 | 1,700 | 99.0 | (b) | 5.7 | 0 | 54 |
| Example 14 | 1,700 | 99.0 | (c) | 11.3 | 1 | 46 |
| Example 15 | 1,700 | 99.0 | (d) | 12.2 | 1 | 45 |
| Comparative Example 12 | 1,700 | 99.0 | — | 35.3 | 0 | 52 |
| Comparative Example 13 | — | — | — | 25.2 | 2 | 38 |
| Comparative Example 14 | — | — | — | 1.2 | 3 | 27 |

EXAMPLES b 12 TO 15 AND COMPARATIVE EXAMPLES 12 TO 14

In each Example, using a sizing solution as identified in the following item (1), a coated paper was prepared by a method as identified in the following item (2). The tests for evaluating the physical properties of the coated paper were conducted in the same manner as in Example 1, and the results are shown in Table 4. In Comparative Example 14, the non-coated paper (raw paper) was

What is claimed is:

1. A sizing agent for paper, comprising:
(A) 100 parts by weight of polyvinyl alcohol, and
(B) from 1 to 20 parts by weight of an oxyethylene-oxypropylene block copolymer having two terminals, wherein said oxyethylene is present in a proportion of from 20 to 40% by weight, said oxypropylene is present in a proportion of from 60 to 80% by weight, one of said terminals is a hydrogen atom, the remaining one of said terminals is a hydrogen atom or a $C_{1-10}$ alkoxy group, and said oxyethylene-oxypropylene block copolymer has a weight average molecular weight of from 600 to 1,200.

2. The sizing agent for paper according to claim 1, wherein of the two terminals of component B, one terminal is a hydrogen atom bonded to an oxygen atom of an oxyethylene unit or an oxypropylene unit, and the other terminal is a $C_{1-10}$ alkoxy group.

3. The sizing agent for paper according to claim 1, wherein the polyvinyl alcohol as component A is a homopolymer or copolymer of a fatty acid vinyl ester, which is completely or partially hydrolyzed.

4. The sizing agent for paper according to claim 1, wherein the polyvinyl alcohol as component A is a polymer of vinyl acetate, which is completely or partially hydrolyzed.

5. The sizing agent for paper according to claim 1, wherein the degree of hydrolysis of component A is at least 90 mol %.

6. The sizing agent for paper according to claim 1, wherein the degree of hydrolysis of component A is at least 97.5 mol %.

7. The sizing agent for paper according to claim 1, wherein the polyvinyl alcohol as component A has an average degree of polymerization of from 500 to 4,000.

8. The sizing agent for paper according to claim 1, wherein the polyvinyl alcohol as component A is water-soluble.

9. The sizing agent for paper according to claim 1, wherein component B is in an amount of from 2 to 10 parts by weight, per 100 parts by weight of component A.

10. A sizing agent for paper, consisting essentially of:
(A) 100 parts by weight of polyvinyl alcohol, and
(B) from 1 to 20 parts by weight of an oxyethylene-oxypropylene block copolymer having two terminals, wherein said oxyethylene is present in a proportion of from 20 to 40% by weight, said oxypropylene is present in a proportion of from 60 to 80% by weight, one of said terminals is a hydrogen atom, the remaining one of said terminals is a hydrogen atom or a $C_{1-10}$ alkoxy group, and said oxyethylene-oxypropylene block copolymer has a weight average molecular weight of from 600 to 1,200.

* * * * *